Feb. 4, 1958 R. H. HALVORSEN 2,822,420

CONTROL UNIT FOR COMPOSING MACHINES

Filed June 21, 1955 2 Sheets-Sheet 1

INVENTOR
RALPH H. HALVORSEN
BY Emery Robinson
ATTORNEY

INVENTOR
RALPH H. HALVORSEN

BY Emery Robinson
ATTORNEY

United States Patent Office 2,822,420
Patented Feb. 4, 1958

2,822,420

CONTROL UNIT FOR COMPOSING MACHINES

Ralph H. Halvorsen, Des Plaines, Ill., assignor to Teletypesetter Corporation, Chicago, Ill., a corporation of Delaware Application June 21, 1955, Serial No. 516,861
5 Claims. (Cl. 178—26)

This invention relates to improvements in control units for composing machines and more particularly to record controlled facilities therefor.

The primary object of the invention is to provide means for reading the information translated from business machine record cards directly on the record reader of a control unit without the intervention of perforated tape.

Another object of the invention is to provide code translating instrumentalities for translating data stored in statistical or tabulating cards in one code, into information stored in a different code in a signal controlled storing device.

More specifically, the arrangement according to the invention contemplates a record card code converter of the type disclosed in United States Patent No. 2,604,538 for reading the coded information on a tabulating card (such as used in business machines), and converting this information into a different code (for example, Baudot code) for operating a group of selector magnets whose armatures are arranged to control instrumentalities which are adapted to be selectively superposed over the sensing pins of a record reader, such as shown in Fig. 16 of United States Patent No. 2,091,286.

Figure 1:
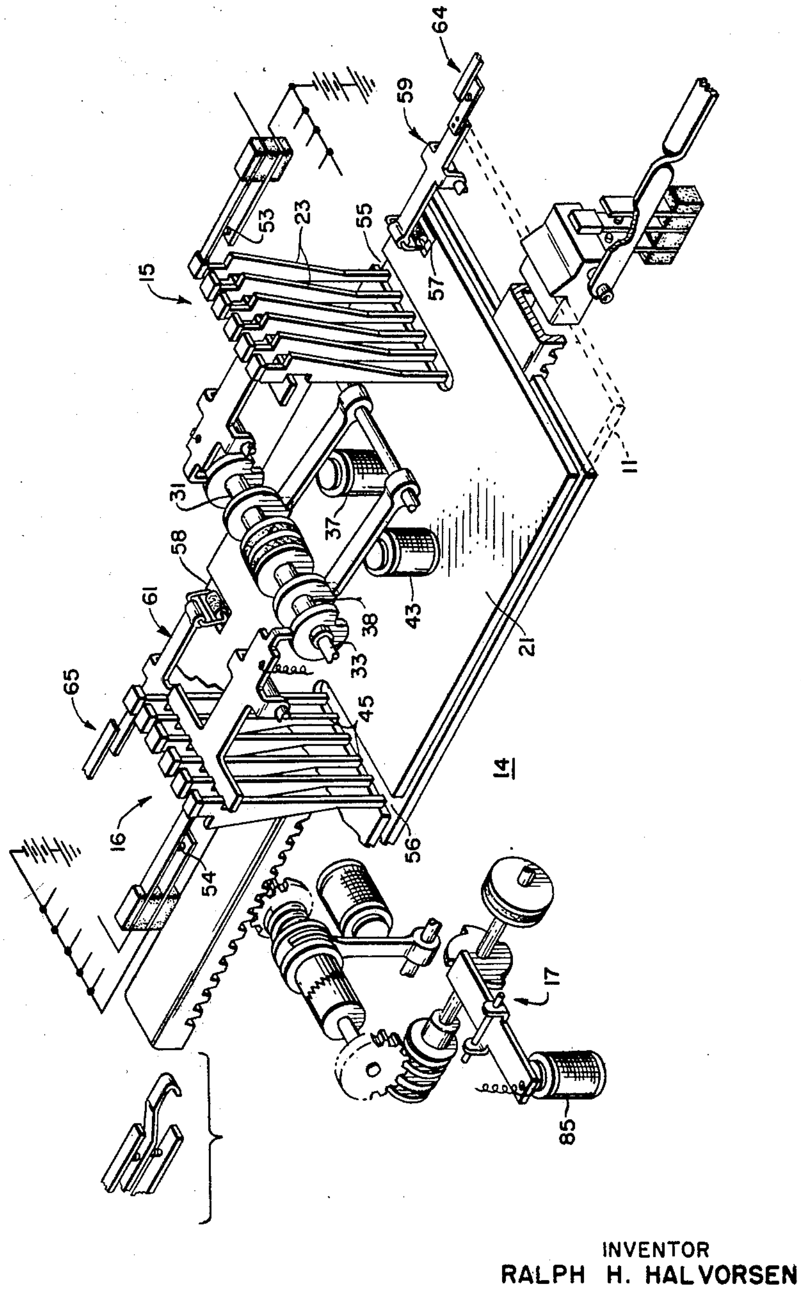
Figure 2:
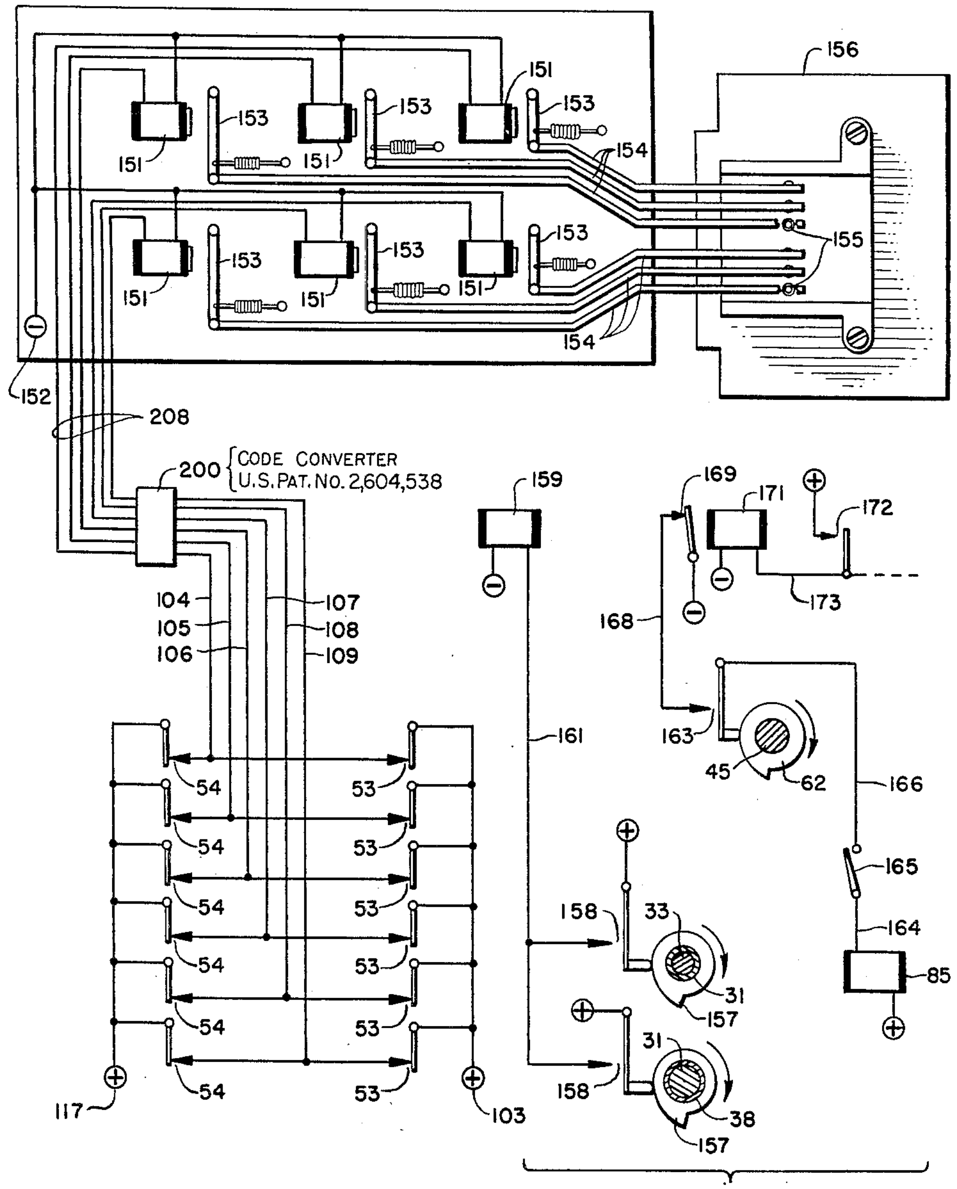

A better understanding of the present invention will be obtained from the following description, taken in conjunction with the accompanying drawings wherein:

Fig. 1 is a perspective view of the card sensing device utilized in connection with the system according to the present invention; and Fig. 2 is a schematic diagram showing the instrumentalities included in the circuit arrangement according to the present invention.

Having reference to Fig. 1, the card sensing mechanism 14 is shown, and will be only briefly described herein, since it is fully described in the aforesaid United States Patent No. 2,604,538, which is incorporated herein by reference. The card 11, which in the form of tabulating card contemplated herein, is provided with two fields; namely, an upper field and a lower field, which are scanned or read sequentially by sensing mechanisms 15 and 16. Upon being fed into the sensing device 14, the card 11 is advanced step-by-step, or column by column, by feeding mechanism indicated generally by the numeral 17, fully described in said Patent No. 2,604,538. The card 11 first encounters the sensing means 15 for the upper field. The card sensing means 15 comprises in the present embodiment a series of six sensing fingers 23 which are adapted during the sensing operation to close permutably a corresponding series of contacts 53. After the card 11 has been stepped a predetermined number of columns (for example, 45 columns in certain tabulating cards) and sensing or reading of the upper field has been completed, the card 11 passes beyond the sensing fingers 23, and upon stepping to the 46th column, the sensing means 16 is engaged, which in the present embodiment constitutes a series of six sensing fingers 45. The timed operation of the sensing means 15 and 16 is governed by the cams carried on sleeves 31 and 38 on shaft 33, under the control of the magnets 37 and 43, respectively, in the manner fully described in said Patent No. 2,604,538.

The upper extremities of sensing fingers 23 control the opening and closing of individual contacts 53. Similarly, the upper ends of fingers 45 cooperate with individual contacts 54. In addition to the slots 55 and 56 in upper plate 21 for the sensing pins 23 and 45, respectively, apertures 57 and 58 are also provided therein for upper and lower field contact devices 59 and 61, respectively. Contact device 59 comprises a lever, one arm of which is provided with means operable through aperture 57 to coact with the card 11, while the other arm coacts with a contact 64. With a card in the card sensing device 14 adjacent sensing fingers 23, the card contact 64, for the upper field will open, the effect of which is fully set forth in said Patent No. 2,604,538. The contact 64 will remain open until the card 11 has progressed stepwise the 45 columns of the upper field. The upper field and lower field card contacts 64 and 65, respectively, are so located that as the card 11 moves from the forty-fifth to the forty-sixth column, the lower field contacts 65 will open and the upper field card contacts 64 will close, the effect of which is also fully set forth in said Patent No. 2,604,538. The system according to the invention will function thus until all 90 card columns are sensed.

Having reference to Fig. 2, the contacts 53 are shown connected to battery 103, and contacts 54 are connected to battery 117. As fully described in said Patent No. 2,604,538, the contacts 53 and 54 are connected to conductors 104 to 109, inclusive, which in turn are connected through a fan circuit to conductors 208 associated with a group of Baudot code magnets 151 (similar to Baudot code relay magnets 131 in said Patent No. 2,604,-538). The box 200 (Fig. 2) embraces substantially the circuit disclosed in Figs. 1 to 5, inclusive, of said Patent No. 2,604,538. In the present embodiment of the invention, the conductors 208 are connected to the windings of magnets 151 individual thereto, so that energizing circuits for magnets 151 are established selectively from batteries 103 or 117, through selectively closed contacts 53 or 54, over conductors 104 to 109, through the fan circuit disclosed in said patent to energize respective Baudot code magnets (see relay magnets 131 in Patent No. 2,604,538), then over conductors 208 (same as conductors 208 in said patent), through the windings of selected magnets 151 to negative battery 152. Thus, as described in said Patent No. 2,604,538, the code conversion from card code to Baudot (or other) code is achieved through a fan circuit to a group of Baudot code magnets, which set up the Baudot code to be impressed on magnets 151.

Attached pivotally to each of the armatures 153 of magnets 151 is a slidable blocking member 154. Members 154 are normally superposed above respective sensing pins 155 in the record reader 156 of a control unit of the type disclosed in United States Patent No. 2,091,286. Members 154 are adapted to be withdrawn from blocking relation with sensing pins 155 by the armatures 153 (of magnets 151) to which they are connected. As previously mentioned, the record reader 156 is similar to the record reader mechanism 54 shown in Figs. 9 and 16 of said Patent No. 2,091,286. Thus, the blocking members 154 are adapted to be positioned permutably, either to block or to allow the sensing pins of the record reader mechanism 156 to sense the code formed by the blocking members 154 in the same manner as if perforated tape (such as tape 111 in Patent No. 2,091,286) were sensed.

On each of the sleeves 31 and 38 is carried a cam 157 which governs individual contacts 158 (connected in parallel). Thus, during each cycle of rotation of sleeves 31 or 38, following the sensing or reading operation of sensing fingers 23 or 45, respectively, one or the other of said contacts 158 is closed to complete an energizing circuit for the clutch magnet 159 of the control unit (similar to magnet 311, Fig. 13, of application Serial No.

366,912, filed July 9, 1953, by Mr. M. T. Goetz), extending from positive battery, through contact 158 over conductor 161 and through the winding of clutch magnet 159 to negative battery. The operation of clutch magnet 159 will start the record reader mechanism 156 to function, moving the sensing pins 155 upward. With any of the magnets 151 operated, its associated link 154 will be moved to a position where the sensing pins 155 will not be blocked and consequently the sensing pin 155 will move to its extreme upward position as if the mechanism were sensing a perforated hole in a paper tape.

Suitably mounted for cyclical rotation on shaft 45 in the record reader 156 of the control unit is a cam 62 adapted to govern the timed closure of contact 163 (shaft 45 is analogous to shaft 45 shown in said Patent No. 2,091,286 and said application Serial No. 366,912). Thus, once during each revolution of shaft 45, and occurring after each sensing or reading operation by members 154 and pins 155, the cam 162 closes its contact 163 to complete an energizing circuit for the stepping magnet 85 (Figs. 1 and 2) in the card reader 14 to step the card 11 one column distance. The energizing circuit for magnet 85 extends from positive battery, through the winding of magnet 85 (Fig. 2), over conductor 164, through the Off-On switch 165 (when closed), over conductor 166, through contact 163 (when cyclically closed), over conductor 168, and through contact 169 (now closed) of control relay 171, to negative battery.

It is thus observed that there is provided a revertive control between the card reader 11 and the control unit exemplified by the record reader 156. That is, the record reader 156 is initiated into a cyclic operation upon the closure of one or the other of contacts 158 in the card reader 14, and card reader 14 is initiated into a cyclic operation upon the closure of contact 163.

In the performance of certain functions, such as magazine shift, add-thin space, upper rail and lower rail, a delay interval is required, wherein the record reading operation is interrupted during the function operation, at the conclusion of which the record reading operation is resumed. Pursuant to the initiation of such a function, a contact 172 identified with the particular function, is closed to establish an energizing circuit for the control relay 171 extending from positive battery, through contact 172 (when closed), over conductor 173, and through the winding of control relay 171 to negative battery. The contact 173 is comparable to contacts 321 (Fig. 10) of said application Serial No. 366,912.

It is understood that various changes and modifications can be made in the invention without departing from the spirit and scope thereof.

What is claimed is:

1. An arrangement for converting information punched in a tabulating card in one code into another code for the operation of a control unit for composing machines, comprising means for advancing said card column by column, means for sensing said card, an electrical circuit means including card controlled contact means controlled by said sensing means for effectuating said sensing operations, a fan circuit in said electrical circuit means, means under the control of the codes punched in said card for establishing a circuit through said fan circuit, relay means governed by said fan circuit for establishing a condition whereby the card code is converted into said other code, means for transmitting a signal according to said other code, means for receiving said transmitted signal, said receiving means comprising reading means having a plurality of reciprocable reading elements, instrumentalities mounted for sliding movement between a forward position over respective ones of said reading elements and a retracted position free of said reading elements, and means responsive to said transmitted signals for facilitating selective movement of said instrumentalities in a direction toward and away from said reading elements.

2. An arrangement for converting information punched in a tabulating card in one code into another code for the operation of a control unit for composing machines, comprising means for advancing said card column by column, means for sensing said card, an electrical circuit means including card controlled contact means controlled by said sensing means for effectuating said sensing operations, translating means within said circuit means whereby the card code is converted into said other code, means for transmitting a signal according to said other code, means for receiving said transmitted signal, said receiving means comprising reading means having a plurality of reciprocal reading elements, instrumentalities mounted for sliding movement between a forward position over respective ones of said reading elements and a retracted position free of said reading elements, and means responsive to said transmitted signals for facilitating selective movement of said instrumentalities in a direction toward and away from said reading elements.

3. An arrangement for converting information punched in a tabulating card in one code into another code for the operation of a control unit for composing machines, means for translating said card code into another code, receiving means governed by said other code, said receiving means comprising sensing means having a plurality of reciprocable sensing elements, instrumentalities mounted for sliding movement between a forward position over respective ones of said sensing elements and a retracted position free of said sensing elements, and means governed by said translating means for facilitating selective movement of said instrumentalities in a direction toward and away from said sensing elements.

4. An arrangement for converting information punched in upper case or lower case in two fields in a tabulating card in one code to another code for the operation of a control unit for composing machines, comprising means for advancing said card column by column, means for sensing one field, means for sensing the other field, electrical circuit means including card controlled contact means controlled by said sensing means for effectuating said sensing operations sequentially, a fan circuit in said electrical circuit means, means under the control of the codes punched in said card for establishing a circuit through said fan circuit, relay means governed by said fan circuit for establishing a condition whereby the card code is converted to said other code, means for transmitting a signal according to said other code, means for automatically inserting an appropriate shift code signal upon each change of case, means for receiving said transmitted signals, said receiving means comprising reading means having a plurality of reciprocable reading elements, instrumentalities mounted for sliding movement between a forward position over respective ones of said reading elements and a retracted position free of said reading elements, and means responsive to said transmitted signals for facilitating selective movement of said instrumentalities in a direction toward and away from said reading elements.

5. In an arrangement for converting information punched in a tabulating card in one code into another code for the control of a record reader, means for translating said card code into another code, means in said record reader governed by said other code, said means in said record reader comprising sensing means having a plurality of reciprocable sensing elements, instrumentalities mounted for sliding movement between a forward position over respective ones of said sensing elements and a retracted position free of said sensing elements, and means governed by said translating means for facilitating selective movement of said instrumentalities in a direction toward and away from said sensing elements.

References Cited in the file of this patent

UNITED STATES PATENTS

| | | |
|---|---|---|
| 1,895,718 | Kleinschmidt | Jan. 31, 1933 |
| 2,604,538 | Halvorsen | July 22, 1952 |